(12) United States Patent
Ceccarelli et al.

(10) Patent No.: US 7,850,192 B2
(45) Date of Patent: Dec. 14, 2010

(54) ADJUSTABLE HITCH FOR TOWING

(75) Inventors: Charles J Ceccarelli, Mountain Home, ID (US); Kevin B Haight, Boise, ID (US)

(73) Assignee: Inventive, LLC, Mountain Home, ID (US)

( * ) Notice: Subject to any disclaimer, the term of this patent is extended or adjusted under 35 U.S.C. 154(b) by 183 days.

(21) Appl. No.: 12/270,115

(22) Filed: Nov. 13, 2008

(65) Prior Publication Data

US 2010/0117333 A1  May 13, 2010

(51) Int. Cl.
*B60D 1/16* (2006.01)

(52) U.S. Cl. .................. 280/478.1; 280/491.5

(58) Field of Classification Search .......... 280/477, 280/478.1, 479.2, 479.3, 491.5
See application file for complete search history.

(56) References Cited

U.S. PATENT DOCUMENTS

| | | | | |
|---|---|---|---|---|
| 2,438,749 | A | * | 3/1948 | Harrer ................. 280/511 |
| 3,099,462 | A | * | 7/1963 | Lent .................... 280/479.3 |
| 3,126,210 | A | * | 3/1964 | Hill ..................... 280/479.2 |
| 3,169,028 | A | * | 2/1965 | Scrivner ............... 280/479.2 |
| 3,266,818 | A | * | 8/1966 | Hill et al. ............. 280/479.3 |
| 3,860,267 | A | * | 1/1975 | Lyons .................. 280/479.3 |
| 3,912,119 | A | * | 10/1975 | Hill et al. ............. 280/479.2 |
| 4,176,854 | A | | 12/1979 | Wayland |
| 4,944,525 | A | | 7/1990 | Landry |
| 4,991,865 | A | | 2/1991 | Francisco |
| 5,009,446 | A | | 4/1991 | Davis |
| 5,547,210 | A | | 8/1996 | Dugger |
| 5,630,606 | A | | 5/1997 | Ryan |
| 6,068,281 | A | | 5/2000 | Szczpski |
| 6,126,188 | A | * | 10/2000 | Volodarsky ........... 280/478.1 |
| 6,328,326 | B1 | | 12/2001 | Slatten |
| 7,055,845 | B1 | | 6/2006 | Putnam |
| 7,219,915 | B2 | | 5/2007 | Christensen |
| 7,255,362 | B2 | | 8/2007 | Smith |
| 7,293,791 | B1 | | 11/2007 | Williams |

(Continued)

OTHER PUBLICATIONS

Hitches, Hitch Accessories, Hitch Wiring (866)308-9054; http://www.drawtite-hitches.com/search?q=adjustable% 20hitch&vcn=g; 13 pages, Oct. 29, 2008.

(Continued)

*Primary Examiner*—Kevin Hurley
(74) *Attorney, Agent, or Firm*—Michael P Mazza, LLC

(57) ABSTRACT

An adjustable ball-type hitch assembly, and a method for using it. The hitch assembly is connected to a hitch receiver of a towing vehicle on one end, and to a vehicle to be towed having a ball receiver, on the other end. In a preferred embodiment, the adjustable hitch assembly may include a base attachable to the receiver, and a sliding element such as a tongue supporting the ball and pivotally attached to the base. The sliding element may include a slot or groove enabling the sliding element to move along its longitudinal axis relative to the base, and to also rotate about a vertical axis perpendicular to a horizontal plane containing at least a portion of the sliding element, enabling the ball to be moved in various directions in a substantially horizontal plane to facilitate connection of the ball to the towed vehicle. Preferably the hitch includes means for locking and unlocking angular and linear movement of the sliding element and ball, such as a cam lock, which is preferably and easily manipulable by one hand.

20 Claims, 4 Drawing Sheets

U.S. PATENT DOCUMENTS 7,338,062 B1 3/2008 Violette et al.
7,425,014 B1 9/2008 Palmer

OTHER PUBLICATIONS

Swinger & Roll-A-Hitch Ball Mounts; http://www.hitchcorner.com/ball_mounts.htm#swinger, Nov. 13, 2008.

Swinger Hitch Ball Mount; http://www.hitchcorner.com/ball)mounts.htm#swinger, Nov. 13, 2008.

http://www.ahlstrand-marine.com/cgi-bin/nav.cgi?marinerssupplystore/qs1000.html (one step), Nov. 13, 2008.

http://www.ahlstrand-marine.com/cgi-bin/nav.cgi?marinerssupplystore/quickstep.html (quickstep), Nov. 13, 2008.

* cited by examiner

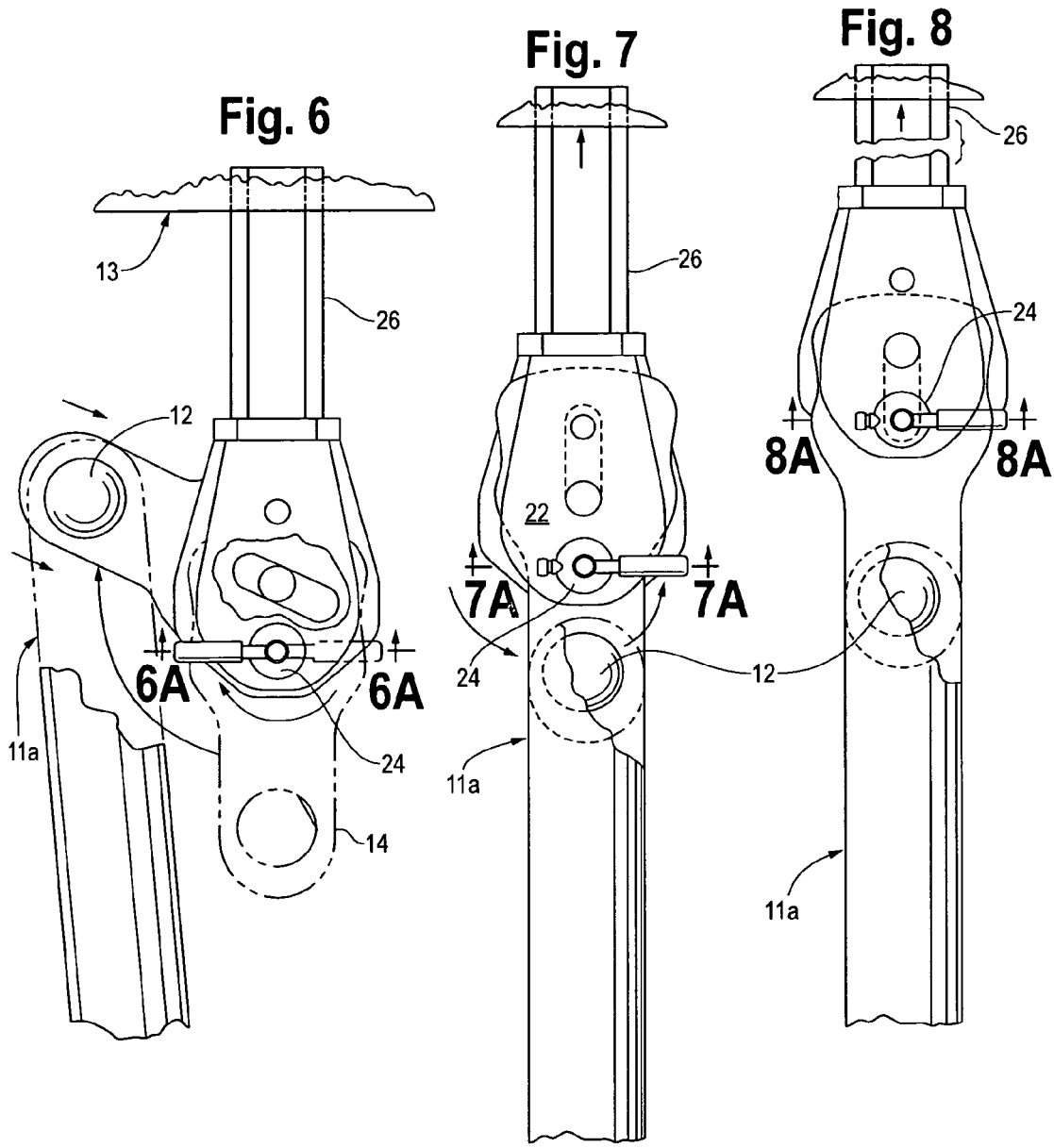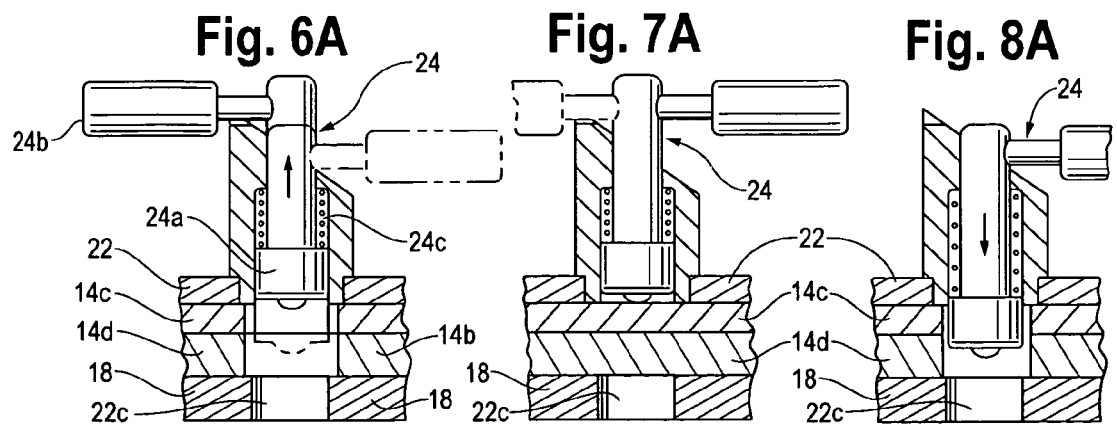

ADJUSTABLE HITCH FOR TOWING

BACKGROUND OF THE INVENTION

The present invention generally relates to an adjustable hitch useful for towing trailers or disabled vehicles, for example. More specifically, the invention is directed to a hitch which can be rotated as well as moved fore and aft, and also placed into towing position, simply by manipulating one adjustable pin.

Ball hitches are well known in the prior art. A major disadvantage with hitch assemblies is that they do not allow for trailer misalignment in the horizontal plane. In other words, as the pulling vehicle is backed up to the tongue of a trailer, there is a certain amount of error in the process: typically, the towing vehicle must be moved and adjusted several times in order to position the ball of the hitch sufficiently close to the receiving socket of the towed vehicle (e.g., trailer, RV, disabled vehicle, etc.) so that a connection may be made.

Accordingly, it would be advantageous to provide a hitch assembly which can be adjusted for misalignment without moving the pulling vehicle and without the need for external mountings such as cameras, alignment poles, etc. It would also be advantageous to provide a universal hitch assembly with the ability to connect to a standard hitch receiver, without the need for any special installation. Further, it would be advantageous to use a pulling method to lock the hitch, as opposed to the pushing method used by many other hitch assemblies. Using a pulling method to locking the hitch has at least two advantages: (1) by locking trailer brakes or blocking the trailer wheels, the hitch can be extended (by moving the pulling vehicle forward) and locked into position; and (2) it provides the hitch with a large range of motion in various directions while avoiding difficulties in moving the hitch back into a straight line for towing.

SUMMARY OF THE INVENTION

The objects mentioned above, as well as other objects are solved by the present invention, which overcomes disadvantages of prior hitch assemblies, while providing new advantages not believed associated with such assemblies.

In one preferred embodiment, a ball-type hitch assembly is provided for connection to a receiver of a towing vehicle on one end, and for connection to a vehicle to be towed on the other end. This embodiment of the hitch assembly includes a base attachable to the receiver, and a sliding element supporting the ball and pivotally attached to the base. The sliding element, which may take the form of (but is certainly not limited to) a tongue plate, may include a slot or groove enabling the sliding element to move along its longitudinal axis relative to the base. The sliding element is also rotatable about a vertical axis perpendicular to a horizontal plane containing at least a portion of the sliding element, enabling the ball to be moved in various directions in a substantially horizontal plane to facilitate connection of the ball to the towed vehicle. Preferably, means for locking and unlocking angular and linear movement of the tongue and ball is provided, which may be manipulable by one hand.

In a particularly preferred embodiment, the locking and unlocking means includes a single pin whose movement is manipulable by one hand. This pin may be a cam lock or a weighted pin, so that the sliding element may be automatically locked in an extended position relative to the base, such as when the towing vehicle pulls forward. The sliding element may include a tongue plate.

The hitch assembly may include devices or mechanisms to allow it to be adjusted in a vertical plane relative to ground. One such device or mechanism may include a bracket adjustably connected to the receiver, while the receiver may include or be connected to a vertically-extending tube with apertures. Height adjustment pins may be used to adjustably connect the vertically-extending tube and the bracket, enabling height-adjustment of the hitch assembly.

In one preferred embodiment, the base may include an apertured plate and a supporting rib. A pivot pin may be used to connect the sliding element and the base; the sliding element may also rotate or pivot about this pin relative to the base. The pivot pin may pass through the sliding element groove and an aperture in the base. An upper apertured plate may be located above the sliding element. A safety pin may be used, passing through apertures in the upper plate and the base, to retain the sliding element in position adjacent the base if the means for locking and unlocking were to fail.

In the preferred embodiment, the two ends of the sliding element groove define two outermost and innermost arcs of angular movement of the ball. The ball may be positioned at substantially all locations between the two arcs. (Ball travel may be limited due to the location of the receiver connecting to the towing vehicle.).

Preferably, the movement of the sliding element such as the tongue, and the ball, is smooth and continuous, whether the ball is being moved in a direction along the longitudinal axis of the tongue, or whether the ball is being rotated about the vertical axis in the horizontal plane.

In an alternative preferred embodiment, a method is provided for connecting a towing vehicle having a hitch receiver to a towed vehicle using an adjustable ball-type hitch assembly having a base attachable to the receiver, the base connected to a sliding tongue supporting the ball, and the hitch assembly also including means for locking and unlocking angular and linear movement of the tongue and ball relative to the base and receiver. In this preferred method, the base may be connected to the hitch assembly using a hitch receiver of the towing vehicle, by first moving the towing vehicle so that the base of the hitch assembly is adjacent a ball receiver on the towed vehicle (although not necessarily in that order). A means for locking and unlocking movement of the tongue and ball may now be released, enabling the ball to be moved; this movement may include both angular movement of the tongue about a vertical axis relative to ground as well as linear movement of the tongue along its longitudinal axis in a horizontal plane relative to ground. This will facilitate connection of the ball to the ball receiver on the towed vehicle. The releasing step may be accomplished using a single pin capable of being engaged to and disengaged from the tongue in a motion manipulable by one hand, such as a cam lock or weighted pin. The pin may be re-engaged, to lock the tongue in place relative to the base, such that the tongue is in a fully extended position relative to the base; this step may require or be facilitated by movement, such as forward movement, of the towing vehicle.

In an alternative method step, the height of the tongue and ball may be vertically adjusted relative to the ground, to further facilitate connection of the ball to the ball receiver of the towed vehicle.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Hitch assembly" means a mechanism connecting a towing vehicle with a vehicle to be towed.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIGS. 6, 7 and 8 are top views, partially broken away, showing the sliding element and ball being rotated from an angular position (FIG. 6) to a fully extended and straight position (FIG. 7) upon forward movement of the towing vehicle, while FIGS. 7 and 8 also illustrate linear movement of the sliding element and ball relative to the base;

FIG. 6A is a sectional view taken along reference line 6A-6A of FIG. 6;

FIG. 7A is a sectional view taken along reference line 7A-7A of FIG. 7;

FIG. 8A is a sectional view taken along reference line 8A-8A of FIG. 8;

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 1:
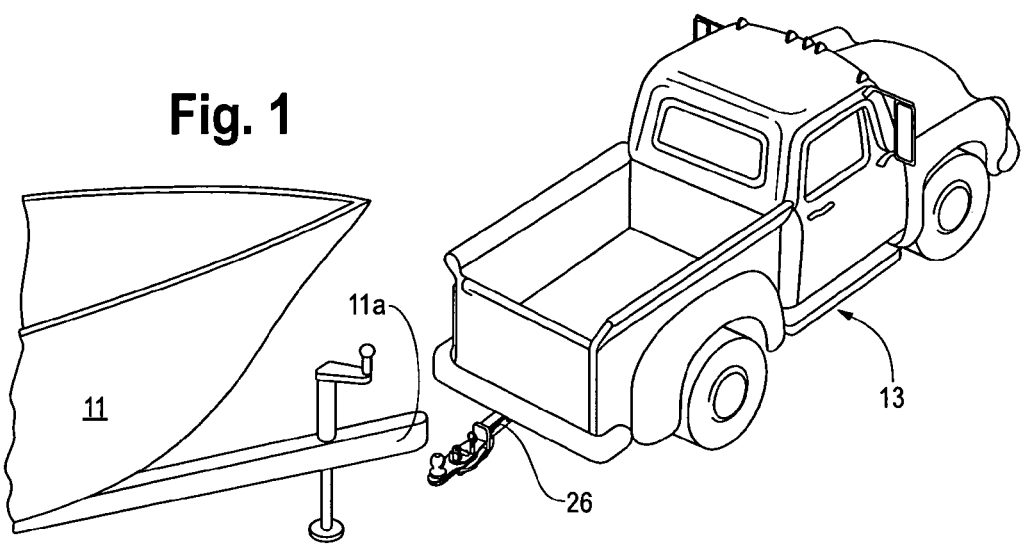
FIG. 1 is a top and side perspective view of a towing vehicle engaging a preferred embodiment of the adjustable hitch assembly of the present invention to a towed vehicle (e.g., a trailer)

Referring first to FIG. 1, a preferred embodiment of an adjustable hitch assembly 10 according to the present invention is shown. Hitch assembly 10 is designed to be connected at one end to a hitch receiver 26 on a towing vehicle 13 (which may be permitted to slide into and engage a standard receiver on the towing vehicle), and at the other end to a ball receiver 11a on a towed vehicle 11.

Figure 2:
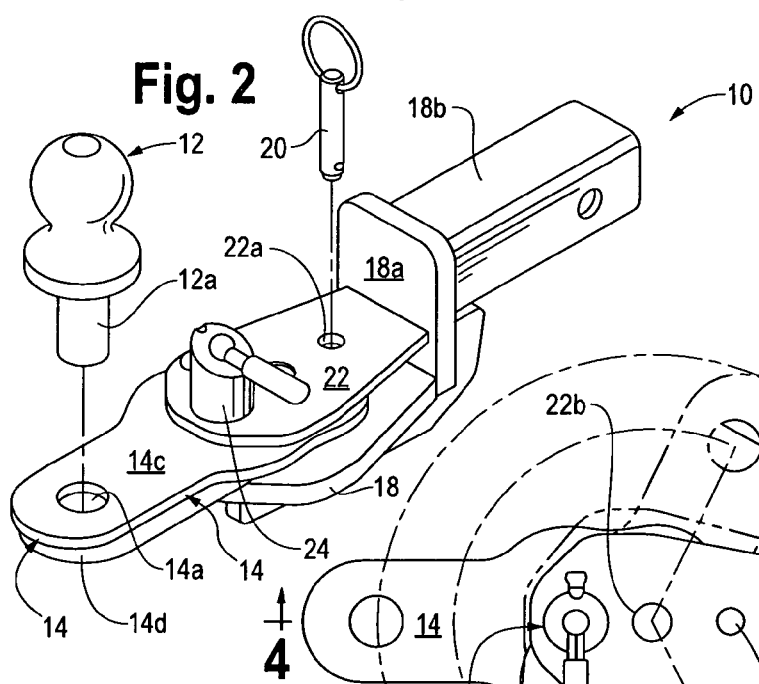
FIG. 2 is a top and side perspective view of a preferred embodiment of the adjustable hitch assembly of the present invention.
Figure 4:
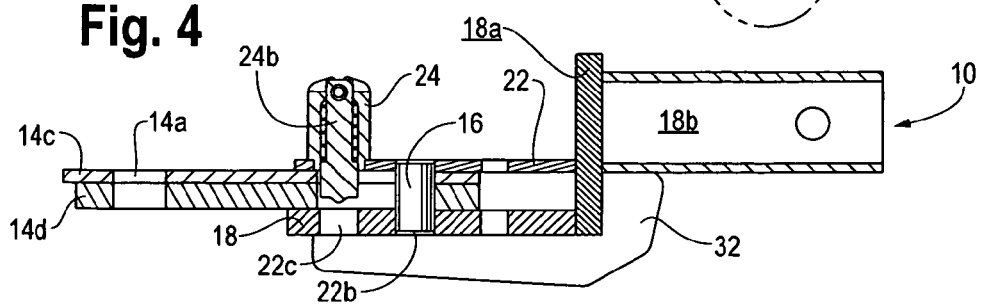
FIG. 4 is a sectional view taken along reference line 4-4 of FIG. 3.

Referring now to FIG. 2, in a preferred embodiment hitch assembly 10 includes a standard ball 12 with a pin 12a for insertion into aperture 14a of sliding tongue 14. Tongue 14 may include tongue base 14c and tongue lip 14d. Tongue 14 provides ball 12 with the ability to slide fore/aft and pivot about main pivot pin 16, shown in FIGS. 4-5. Main pivot pin 16 may be a fixed or welded-in pin, or it may constitute a bolt. Main sliding weldment or base 18 forms a portion of the body of hitch assembly 10, and supports tongue 14. Reinforcing rib 32 lends rigidity and counterbalance to base 18. (If desired, gusset/base 18 could be thickened, e.g., by making a bigger plate, to avoid the use of rib 32.) In the embodiment shown in FIG. 2, base 18 may also be welded to vertical plate 18a, which may in turn be welded to rectangular tube 18b; tube 18b may be configured to slide into hitch receiver 26, which can be engaged with a towing vehicle's standard receiver tube (see FIG. 1).

Figure 9:
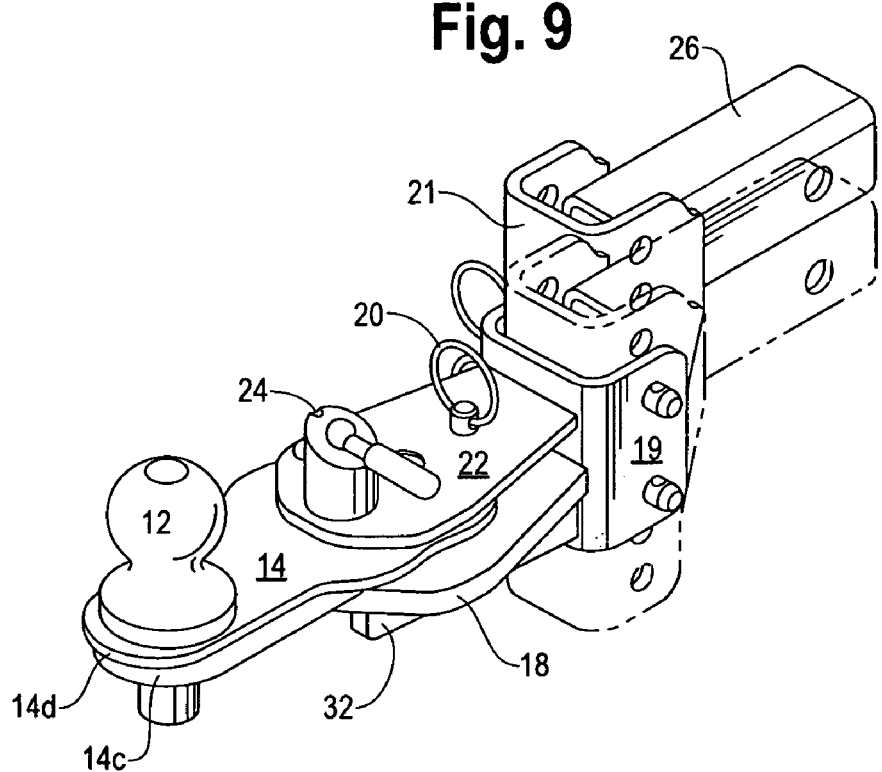
FIG. 9 is a top and side perspective view of an alternative embodiment of the adjustable hitch assembly, which allows the hitch height to be vertically adjusted.
Figure 10:
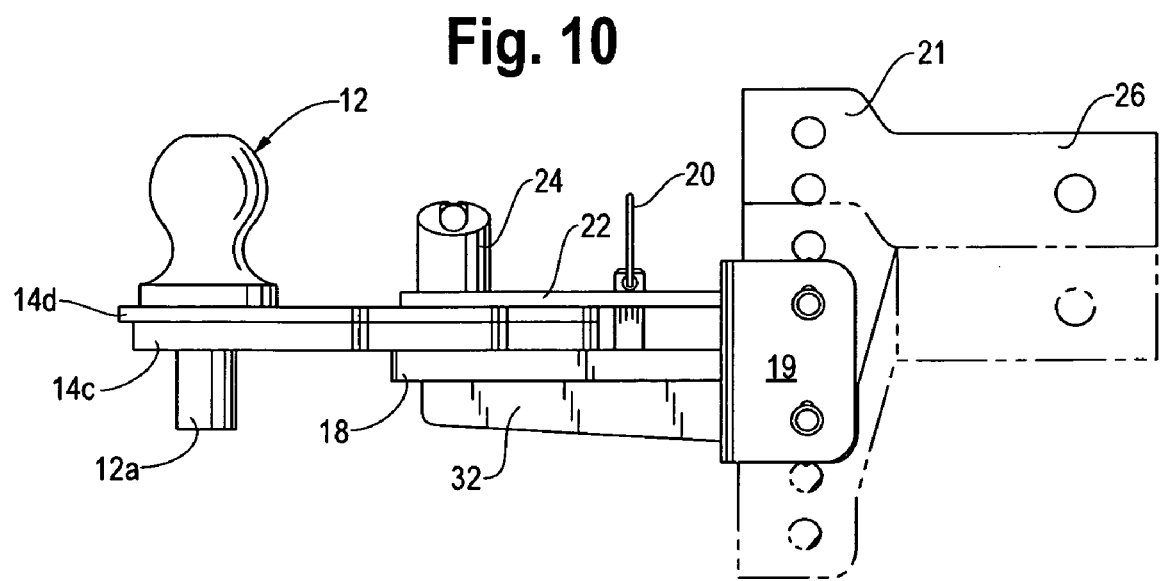
FIG. 10 is a side perspective view of the alternative embodiment shown in FIG. 9.

In the alternative embodiment shown in FIGS. 9 and 10, in which a vertically adjustable hitch 10 is shown, base 18 may be welded to U-shaped bracket 19 as shown; apertures 19a on bracket 19 may then be used to secure the bracket to apertures 21a on adjustable back 21 using height adjustment pins 60, 61. Adjustable back 21 may be rigidly attached to receiver tube 26 on a towing vehicle. In this manner adjustable back 19, which may be fabricated or which may be a solid piece of steel with holes drilled in the side, may be used with a standard receiver in a vehicle, to adjust the height of the hitch to allow trailer towing level to the ground, avoiding tilting of the trailer up or down relative to ground.

Figure 5:
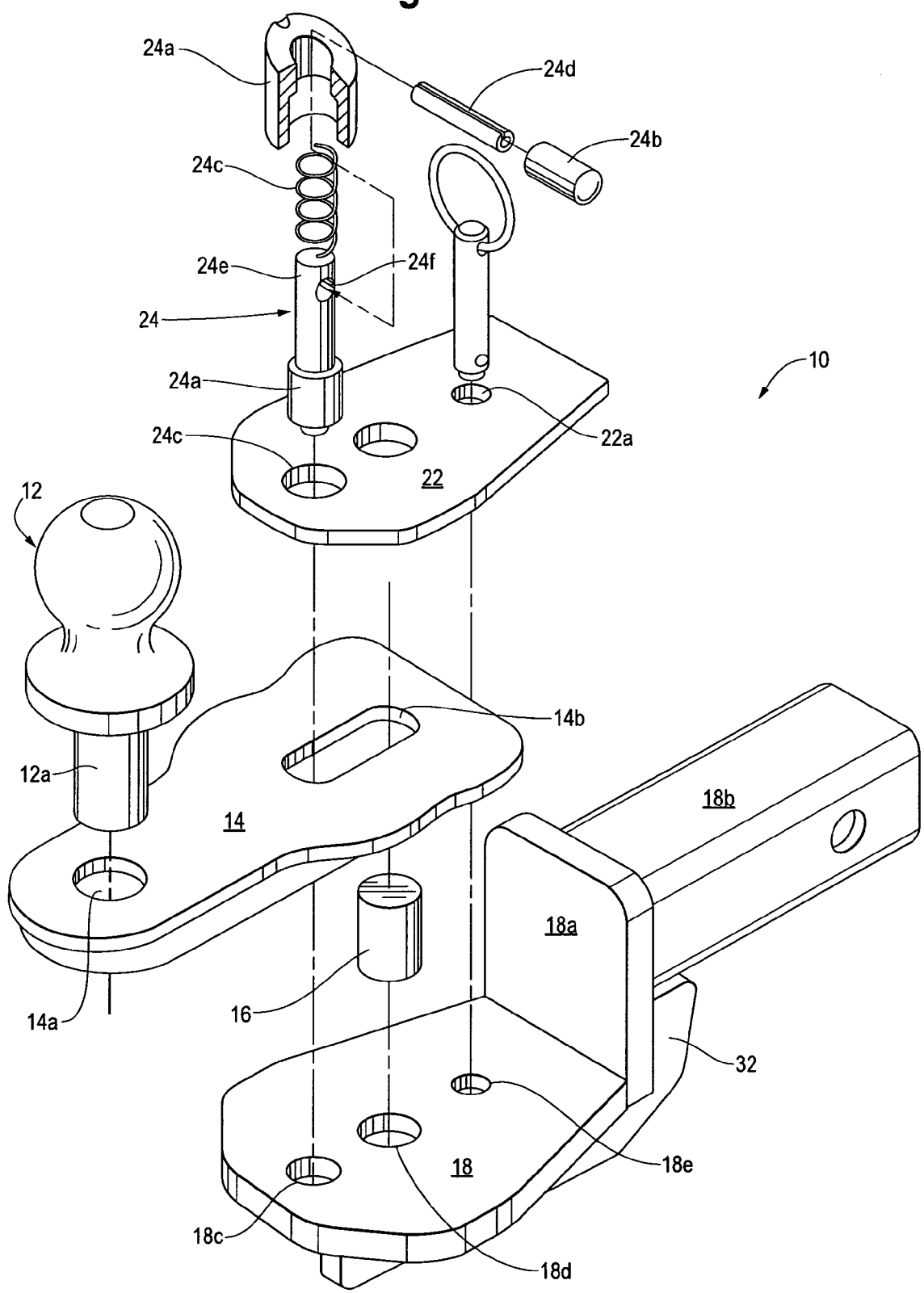
FIG. 5 is an exploded parts perspective view of the adjustable hitch assembly shown in FIG. 2.

Referring to FIGS. 2 and 5, hitch assembly 10 may also include a secondary safety pin 20 which may be inserted into aperture 22a of plate 22; secondary safety pin 20 may be used after the trailer to be towed, for example, has been loaded, as a secondary securing device for safety purposes. Safety pin 20 may be employed to keep sliding tongue 14 from moving or releasing away if cam-lock 24 were to fail. The hitch assembly of the present invention may be operated without safety pin 20, although it is not suggested that this be done.

Still referring to FIGS. 2 and 5, main pivot pin 16 may be welded or bolted into the main sliding assembly. Main pivot pin 16 acts as a pivot and guide for sliding tongue 14. It also functions to keep sliding tongue 14 from pulling completely out of main sliding weldment 18. Pin 24a of cam lock 24 is insertable within aperture 22c of plate 22, and may be permitted to pass through tongue groove 14b and into aperture 18c of base 18, depending upon the location of the tongue, as shown in FIGS. 6A and 8A (in FIG. 7A, the tongue has shifted so that the cam lock pin cannot pass through tongue groove 14B). The purpose of cam lock 24, which may be actuated by rotating handle 24b, is to create an instant, automatic lock such that as sliding tongue 14 pulls out and comes in-line with the main body of hitch assembly 10, cam lock pin 24a enters slot 14b on the sliding tongue and keeps the sliding tongue from moving out of place, restraining both angular and linear movement. Cam lock 24 may include spring 24c, supported by rod 24e, which includes aperture 24f; within handle 24b, tube 24d may be housed.

It should be appreciated by those of ordinary skill in the art that various alternatives to the use of cam lock 24 may be employed. For example, instead of a cam lock a manual pin may be used; this will not provide the automatic locking function, but would still provide a locking function. Alternatively, instead of a cam lock a weighted pin resting on tongue 14 could be used, so that gravity drops the pin through the tongue hole rather than being spring-loaded.

Figure 3:
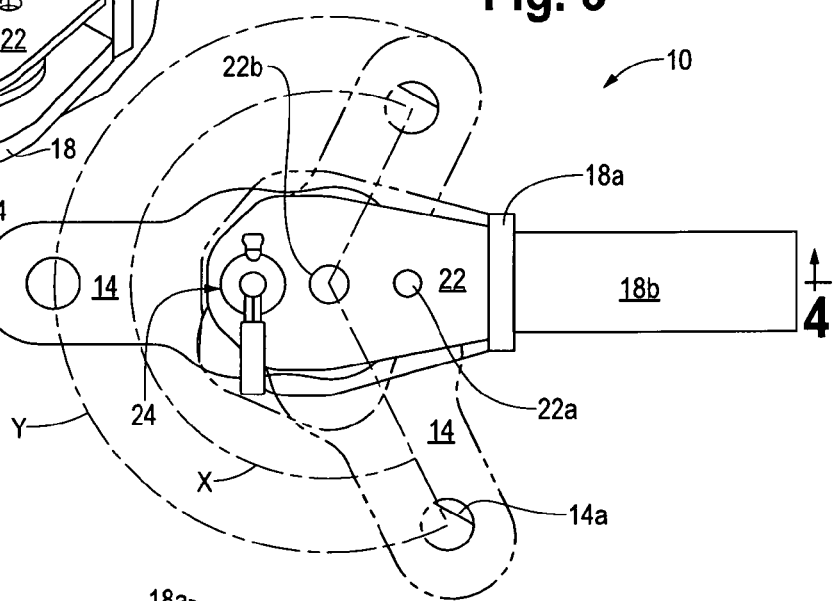
FIG. 3 is a tope view of the adjustable hitch assembly shown in FIG. 2.

Referring now to FIG. 3, the two arcs X and Y show the usable area of the hitch. In other words, by rotating ball 12 about main pivot pin 16 and/or by sliding tongue 14 within its groove 14a in a direction along the longitudinal axis of the tongue, ball 12 may be positioned at any location between these arcs. With outer arc Y, tongue 14 has been pulled to its outermost position so that the distal end of tongue groove 14b is adjacent to the cam lock pin. With outer arc X, tongue 14 has been pushed to its innermost position so that the end of tongue groove 14b closest to receiver tube 18b is adjacent to the cam lock pin.

In operation, and referring now to FIGS. 1 and 6-8, the preferred hitch assembly described above may be used as follows. First, hitch assembly 10 may be slid into hitch receiver 30 of a standard vehicle. Now, secondary safety pin 20 may be removed, cam lock 24 may be released, and tongue 14 may be slid such that it is fully compressed in the device. The pulling vehicle may now be backed up to the tongue of the trailer, such that ball 12 attached to sliding tongue 14 is positioned in proximity to the trailer hitch. The trailer jack may be lowered so that hitch 10 lowers over ball 12, allowing the trailer hitch to be latched to ball 12. Now cam lock 24 may be re-engaged, placing pressure on tongue 14. When the towing vehicle is moved forward, the cam lock pin may be permitted to drop, passing through tongue groove 14b and "finding" and engaging within aperture 22c of plate 22. Lights, trailer brakes, safety chains, etc., may now be hooked up, and blocks may be placed into front of the trailer tires (unless the trailer has brakes). Next, the pulling vehicle may be slowly moved forward, fully extending the hitch and straightening it (the blocks behind the trailer tires, or the trailer brakes, will facilitate this process). Cam lock 24 will audibly click when it finds the hole that locks the sliding tongue in place. Finally, secondary safety pin 20 may be replaced. To unload, simply unhook the trailer and jack it off the hitch.

It will be understood by those of ordinary skill in the art that in order to reduce friction between the moving parts of the hitch assembly, the metal parts may be coated with various physical coatings (e.g., Teflon powder, etc.) Additionally, nylon pads or roller bearings may be provided (such as between plate 22 and tongue 14 and/or between base 18 and tongue 14) to allow these parts to move more freely.

Those of ordinary skill in the art will recognize that other, alternative embodiment, not shown in the drawings, but in keeping with the principles of the present invention may be employed. For example, tongue 14 and main pivot pin 16 may be welded together, while base 18 may include a slot or groove (as opposed to tongue groove 14b) and be welded to plate 22. Alternatively, base 18 and rib 32 could be replaced with a piece of tubing, and tongue 14 may be configured to ride on this tubing. As yet another alternative embodiment, element 14 may not constitute a "tongue" plate but may comprise a bar, tube or disc which may still engage or be connected to ball 12 and which may still include a groove or slot enabling its linear movement relative to a base.

It will also be understood that the hitch assembly components, instead of being welded as shown in the drawings, could be manufactured by casting in a steel casting process, or by machining the parts from a block of steel.

The above description is not intended to limit the meaning of the words used in the following claims that define the invention. For example, while preferred embodiments involving hitch assemblies have been described above, persons of ordinary skill in the art will understand that a variety of other designs still falling within the scope of the following claims may be envisioned and used. It is contemplated that future modifications in structure, function, or result will exist that are not substantial changes and that all such insubstantial changes in what is claimed are intended to be covered by the claims.

We claim:

1. A ball-type hitch assembly for connection to a receiver of a towing vehicle on one end, and for connection to a vehicle to be towed on the other end, comprising:
    a base attachable to the receiver;
    a sliding element supporting a ball associated with the hitch assembly and pivotally attached to the base;
    the sliding element including a slot or groove enabling the sliding element to move along its longitudinal axis relative to the base, and the sliding element also being rotatable about a vertical axis perpendicular to a horizontal plane containing at least a portion of the sliding element, enabling the ball to be moved in various directions in a substantially horizontal plane to facilitate connection of the ball to the towed vehicle;
    means for locking and unlocking angular and linear movement of the tongue and ball, manipulable by one hand; and
    means for adjusting the hitch assembly in a vertical plane relative to ground.

2. The ball-type hitch assembly of claim 1, wherein the means for locking and unlocking comprises a single pin whose movement is manipulable by one hand.

3. The ball-type hitch assembly of claim 1, wherein the sliding element comprises a tongue plate.

4. The ball-type hitch assembly of claim 1, wherein the means for locking and unlocking comprises a cam lock.

5. The ball-type hitch assembly of claim 1, wherein the means for adjusting the hitch assembly comprises a bracket adjustably connected to the receiver.

6. The ball-type hitch assembly of claim 5, wherein the receiver comprises or is connected to a vertically-extending tube with apertures.

7. The ball-type hitch assembly of claim 6, further comprising height adjustment pins for adjustably connecting the vertically-extending tube and the aperture bracket, enabling height-adjustment of the base.

8. The ball-type hitch assembly of claim 1, wherein the base comprises an apertured plate and includes a supporting rib.

9. The ball-type hitch assembly of claim 1, further comprising a pivot pin connecting the sliding element and the base, and about which the sliding element rotates relative to the base.

10. The ball-type hitch assembly of claim 9, wherein the pivot pin passes through the sliding element groove and an aperture in the base.

11. The ball-type hitch assembly of claim 1, further comprising an upper apertured plate located above the sliding element.

12. The ball-type hitch assembly of claim 1, wherein the two ends of the sliding element groove define two outermost and innermost arcs of angular movement of the ball, and wherein the ball may be positioned at substantially all locations between the two arcs.

13. The ball-type hitch assembly of claim 1, wherein the sliding element further comprises a sliding tongue supporting a ball associated with the hitch assembly;
    the tongue including a tongue groove enabling the tongue to move along its longitudinal axis relative to the base, and the tongue also being rotatable about a vertical axis perpendicular to a horizontal plane containing at least a portion of the tongue, enabling the ball to be moved in various directions about a substantially horizontal plane to facilitate connection of the ball to the towed vehicle;

wherein the means for locking and unlocking angular and linear movement of the tongue and ball comprises a single pin, the single pin capable of being engaged to and disengaged from the tongue in a motion manipulable by one hand.

14. The ball-type hitch assembly of claim 1, wherein the means for locking and unlocking comprises a cam lock.

15. The ball-type hitch assembly of claim 1, wherein the movement of the tongue and ball is smooth and continuous, without regard to whether the ball is being moved in a direction along the longitudinal axis of the tongue, or whether the ball is being rotated about the vertical axis in the horizontal plane.

16. The ball-type hitch assembly of claim 1, wherein once the hitch assembly of the towed vehicle is connected to the receiver on the towing vehicle, the connection may be locked by pulling on the towed vehicle using the towing vehicle.

17. A ball-type hitch assembly for connection to a receiver of a towing vehicle on one end, and for connection to a vehicle to be towed on the other end, comprising:
   a base attachable to the receiver;
   a sliding element supporting a ball associated with the hitch assembly and pivotally attached to the base;
   the sliding element including a slot or groove enabling the sliding element to move along its longitudinal axis relative to the base, and the sliding element also being rotatable about a vertical axis perpendicular to a horizontal plane containing at least a portion of the sliding element, enabling the ball to be moved in various directions in a substantially horizontal plane to facilitate connection of the ball to the towed vehicle;
   means for locking and unlocking angular and linear movement of the tongue and ball, manipulable by one hand; and
   further comprising an upper apertured plate located above the sliding element, and a safety pin passing through apertures in the upper plate and the base, and retaining the sliding element in position adjacent the base if the means for locking and unlocking were to fail.

18. A method for connecting a towing vehicle having a hitch receiver to a towed vehicle using an adjustable ball-type hitch assembly having a base attachable to the receiver, the base connected to a sliding tongue supporting the ball, and the hitch assembly also including means for locking and unlocking angular and linear movement of the tongue and a ball associated with the hitch assembly relative to the base and receiver, comprising the steps of:
   connecting the base of the hitch assembly to the hitch receiver of the
   towing vehicle, and moving the towing vehicle so that the base of the hitch assembly is adjacent a ball receiver on the towed vehicle, although not necessarily in that order;
   releasing the means for locking and unlocking movement of the tongue and ball, and moving the ball, which may include both angular movement of the tongue about a vertical axis relative to ground as well as linear movement of the tongue along its longitudinal axis in a horizontal plane relative to ground, to facilitate connection of the ball to the ball receiver on the towed vehicle;
   wherein the releasing step is accomplished using a single pin capable of being engaged to and disengaged from the tongue in a motion manipulable by one hand; and
   further comprising the step of vertically adjusting the height of the tongue and ball relative to the ground, to facilitate connection of the ball to the ball receiver of the towed vehicle.

19. The method of claim 18, wherein the single pin comprises a cam lock, and further comprising the step of re-engaging the cam lock and enabling the tongue to be locked in place relative to the base, which step may require movement of the towing vehicle.

20. The method of claim 18, further comprising the step of pulling the towed vehicle using the towing vehicle, to cause the single pin to engage the tongue, locking the tongue and ball in an extended position relative to the base.

* * * * *